United States Patent
Douglas

(10) Patent No.: US 6,873,413 B2
(45) Date of Patent: Mar. 29, 2005

(54) LASER RECEIVER USING PIN DIODE PHOTODETECTOR ELEMENTS

(75) Inventor: Frank Beard Douglas, Tipp City, OH (US)

(73) Assignee: Trimble Navigation Limited, Sunnyvale, CA (US)

( * ) Notice: Subject to any disclaimer, the term of this patent is extended or adjusted under 35 U.S.C. 154(b) by 263 days.

(21) Appl. No.: 09/965,661

(22) Filed: Sep. 27, 2001

(65) Prior Publication Data

US 2003/0058446 A1 Mar. 27, 2003

(51) Int. Cl.$^7$ .............................................. G03G 15/00

(52) U.S. Cl. ...................................... 356/400; 356/399

(58) Field of Search ............................... 356/399, 138, 356/139.03, 139.04, 140, 141.1, 153, 154, 152.1, 152.2

(56) References Cited

U.S. PATENT DOCUMENTS 4,907,894 A * 3/1990 Guyoncourt ................ 374/120

* cited by examiner

Primary Examiner—Frank G. Font
Assistant Examiner—Willie Davis
(74) Attorney, Agent, or Firm—Dinsmore & Shohl LLP

(57) ABSTRACT

A device for detecting the relative position of a generally horizontal reference plane of light includes a plurality of photodetector elements, a weighting circuit, and an output circuit. The photodetector elements are positioned on the device in a generally vertically oriented row. The weighting circuit provides a portion of the electrical output of each photodetector element as a first reference signal related to the spacing of the photodetector element from a first end of said row, and a portion of the electrical output of each photodetector element as a second reference signal related to the spacing of the photodetector element from the second end of said row. The output circuit is responsive to the weighting circuit for determining the relative levels of the first and second reference signals and the position of said reference plane of light with respect to the detector device.

22 Claims, 2 Drawing Sheets

LASER RECEIVER USING PIN DIODE PHOTODETECTOR ELEMENTS

CROSS-REFERENCE TO RELATED APPLICATIONS

None

STATEMENT REGARDING FEDERALLY SPONSORED RESEARCH OR DEVELOPMENT

Not Applicable

BACKGROUND OF THE INVENTION

The present invention relates to equipment of the type used in surveying and construction and, more particularly, to a detector device for such applications which has an improved photodetector arrangement for detecting the position or level of a reference plane. The plane is typically defined by a rotating laser beam or by a stationary plane of laser light.

Laser systems have commonly been employed in surveying and construction in which a laser beam is rotated in either a horizontal or a graded plane. U.S. Pat. No. 4,062,634, issued Dec. 13, 1977, to Rando, illustrates a laser projector device which provides such a rotating reference beam. The rotating beam defines a plane, and various measurements can be made using the plane as a reference. For example, the elevation of a point remote from the laser beam projector device may be measured by means of a rod on which a laser beam detector is mounted. The bottom of the rod rests on the ground at the point where the measurement is to be made, and the operator moves the detector along the rod to a position where it intercepts the laser beam, as indicated by a display on the detector device. One such detector device is shown in U.S. Pat. No. 4,240,208, issued Jun. 30, 1987, to Pehrson.

A similar surveying system is shown in U.S. Pat. No. 4,732,471, issued Mar. 22, 1988, to Cain et al. In the Cain et al. system, a rotating beam is not used. Rather, a laser transmitter produces an alignment field by projecting laser energy in a non-planar, stationary reference cone. The Cain et al. patent discloses a small, hand-held device which includes a display and a photodetector module.

The detector device shown in the Cain et al. patent includes a pair of adjacent, triangularly shaped photodetector elements. The orientation of the photodetector elements is such that the changes in the signal outputs from the elements which occur due to relative vertical movement of the reference light are inversely related. As the reference light moves upward, the signal output from one of the elements increases while the signal output from the other of the elements decreases. The opposite signal changes occur when the position of the reference light moves downward with respect to the detector device. Naturally, the signal levels are also affected by the intensity of the light source and the distance of the photodetecor elements from the light source. By comparing the relative signal output levels from the two photodetector elements, however, it is possible to obtain an indication of the position of the reference light without regard to the absolute intensity of the light. If desired, the ratio of the output signal levels may be categorized as falling into one or more ranges corresponding to one or more vertical position ranges, as shown in U.S. Pat. No. 4,676,634, issued Jun. 30, 1987, to Petersen.

Although a detector device including a pair of triangular photodetector elements provides accurate operation under varying ambient conditions, it was found that such a device is subject to error in instances where it does not directly face the laser beam projector. Because the casing of the detector device defines an aperture behind which the photodetector elements are positioned, when the beam is not normal to the photodetector elements, a portion of one of the photodetector elements near the edge of the aperture may be placed in shadow. It will be appreciated that this shadow will reduce the output signal from the affected photodetector element, thereby also affecting the ratio of the outputs from the two photodetector elements.

This source of inaccuracy was addressed in U.S. Pat. No. 4,907,874, issued Mar. 13, 1990, to Ake. This patent discloses a detection and display device that includes first and second interdigitated photodetector elements positioned adjacent each other. The photodetector elements are each made up of a plurality of sections which are arranged in a generally vertically oriented row. The heights of the sections of one of the elements increase from the bottom of the row to the top of the row, while the heights of the sections of the other element decrease from the bottom of the row to the top of the row. This arrangement has the advantage that shading of the elements along a vertical edge of the aperture does not affect the relative areas of the elements illuminated by a beam of light.

One limitation with the detection and display device of the '874 patent is that if the beam is too narrow and too few of the sections of the elements are illuminated, a non-uniform response may occur. Further, if the width of the beam happens to be such that as the beam is shifted upward, the top of the beam is shifted onto an area of one element while the bottom of the beam is shifted off of an area of the same element, no change in relative output ratio will occur. The relative output ratio will only change when the beam is moving off of an area of one element while it is moving onto an area of the other element. As a consequence, a stair-step cell output ratio is provided, instead of the desired continuously varying response.

To deal with these problems, an enhanced detection and display device was developed, as shown in U.S. Pat. No. 4,976,538, issued Dec. 11, 1990, to Ake. The device of the '538 patent has first and second interdigitated photoconductor elements that are each made up of a plurality of sections arranged in a generally vertically oriented row. In the same manner as shown in the '874 patent, the heights of the sections of one of the elements increase from the bottom of the row to the top of the row while the heights of the sections of the other element increase from the top of the row to the bottom of the row. Unlike the sections of the device of '874 patent, however, the sections of the elements in the device of the '538 patent are inclined with respect to the row. As a consequence, a beam sweeps across the sections in a manner providing a continuously vary output ratio and across sections of both elements.

While the various detection devices discussed above provide accurate detection of laser light in a reference plane, they all require the use of specially constructed photodetector elements having specific design geometries. Such photodetector elements are expensive, and add significantly to the overall cost of the detection devices. General purpose, photodetector elements in the form of PIN photodiodes are available at a fraction of the cost. It is desired to incorporate such low cost photodetector elements into a detection device, while providing output signals having a continuously varying ratio which indicates beam position.

SUMMARY OF THE INVENTION

This need is met by a device and method according to the present invention in which the relative position of a generally horizontal reference plane of light is detected with a plurality of photodetector elements. The photodetector elements are positioned on the device and arranged in a generally vertically oriented row. Each of the plurality of photodetector elements provides an electrical output when illuminated with the plane of light. The device further includes a weighting circuit for providing a portion of the electrical output of each photodetector element as a first reference signal related to the spacing of the photodetector element from a first end of the row, and for providing a portion of the electrical output of each photodetector element as a second reference signal related to the spacing of the photodetector element from the second end of the row. An output circuit, responsive to the weighting circuit, determines the relative levels of the first and second reference signals. The position of the reference plane of light with respect to the detector device is determined based on the relative levels of the first and second reference signals. If desired, there may be an even total number of photodetector elements. The photodetector elements may be PIN diodes. Further, a display, responsive to the output circuit, may provide an indication of the position of the reference plane of light with respect to the detector device.

The device may further comprise first additional photodetector elements electrically connected in parallel and positioned on the device above the generally vertically oriented row, and second additional photodetector elements electrically connected in parallel and positioned on the device below the generally vertically oriented row. An output from the first additional photodetector elements indicates that the plane of light is significantly above the middle of the generally vertically oriented row of photodetector elements and an output from the second additional photodetector elements indicates that the plane of light is significantly below the middle of the generally vertically oriented row of photodetector elements. The first additional photodetector elements may extend in a generally vertical row, and the second additional photodetector elements may extend in a generally vertical row.

The weighting circuit may comprise a tapped transformer with each of the plurality of photodetector elements being connected to the transformer. The weighting circuit may further comprise one or more resistors connecting the photodetector elements to the transformer.

The plurality of photodetector elements positioned adjacent each other on the device are preferably evenly spaced along the generally vertically oriented row. The first additional photodetector elements and the second additional photodetector elements are also preferably evenly spaced vertically. The spacing between adjacent first additional photodetector elements and the spacing between adjacent second additional photodetector elements preferably are both greater than the spacing between adjacent ones of the plurality of photodetector elements in the generally vertically oriented row.

A method according to the present invention for detecting the relative position of a generally horizontal reference plane of light, comprises the steps of: (a) positioning a plurality of photodetector elements in a generally vertically oriented row, each of the plurality of photodetector elements providing an electrical output when illuminated with the plane of light, (b) providing a portion of the electrical output of each photodetector element as a first reference signal and providing a portion of the electrical output of each photodetector element as a second reference signal, the relative portions of the electrical output from each photodetector being related to the vertical position of the photodetector in the row, and (c) determining the position of the reference plane of light with respect to the row by determining the relative levels of the first and second reference signals. The method may further include the step of displaying an indication of the position of the reference plane of light with respect to the row.

The step of providing a portion of the electrical output of each photodetector element as a first reference signal and providing a portion of the electrical output of each photodetector element as a second reference signal may include the step of separating the portions of the electrical outputs using a tapped transformer with each of the plurality of photodetector elements being connected to the transformer. The photodetector elements may be connected to the transformer using one or more resistors.

Accordingly, it is an object of the present invention to provide a device and method in which the relative position of a generally horizontal reference plane of light may be determined; to provide such a device and method in which relatively inexpensive PIN diode photodetector elements are used, and to provide such a device and method in which two reference signals are generated, the relative levels of the reference signals indicating the position of the reference plane of light with respect to a row of photodetector elements. Other objects, features and advantages will appear more fully in the course of the following discussion.

DETAILED DESCRIPTION OF THE PREFERRED EMBODIMENT

Figure 1:
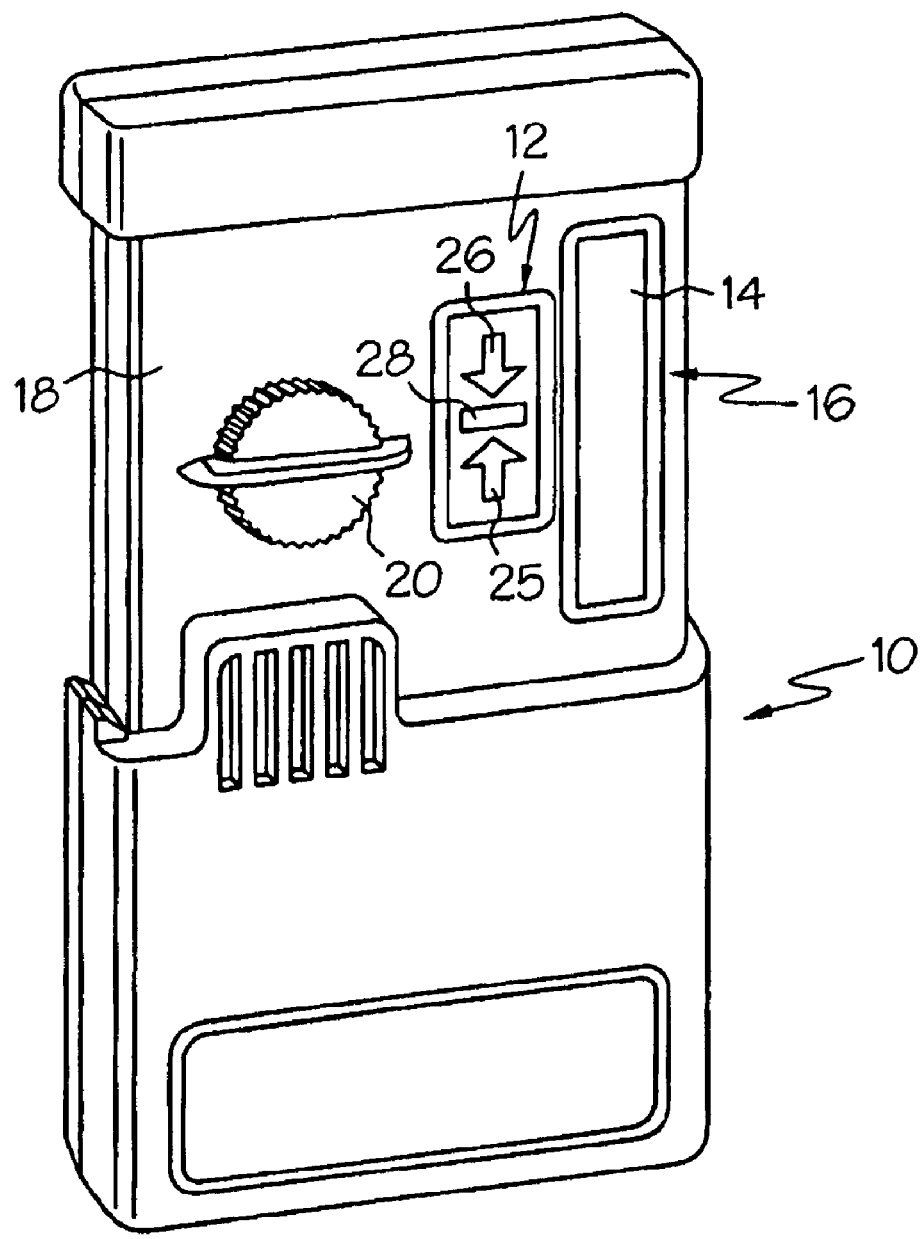
FIG. 1 is a perspective view of a device for detecting the relative position of a generally horizontal reference plane of light according to the present invention.
Figure 2:
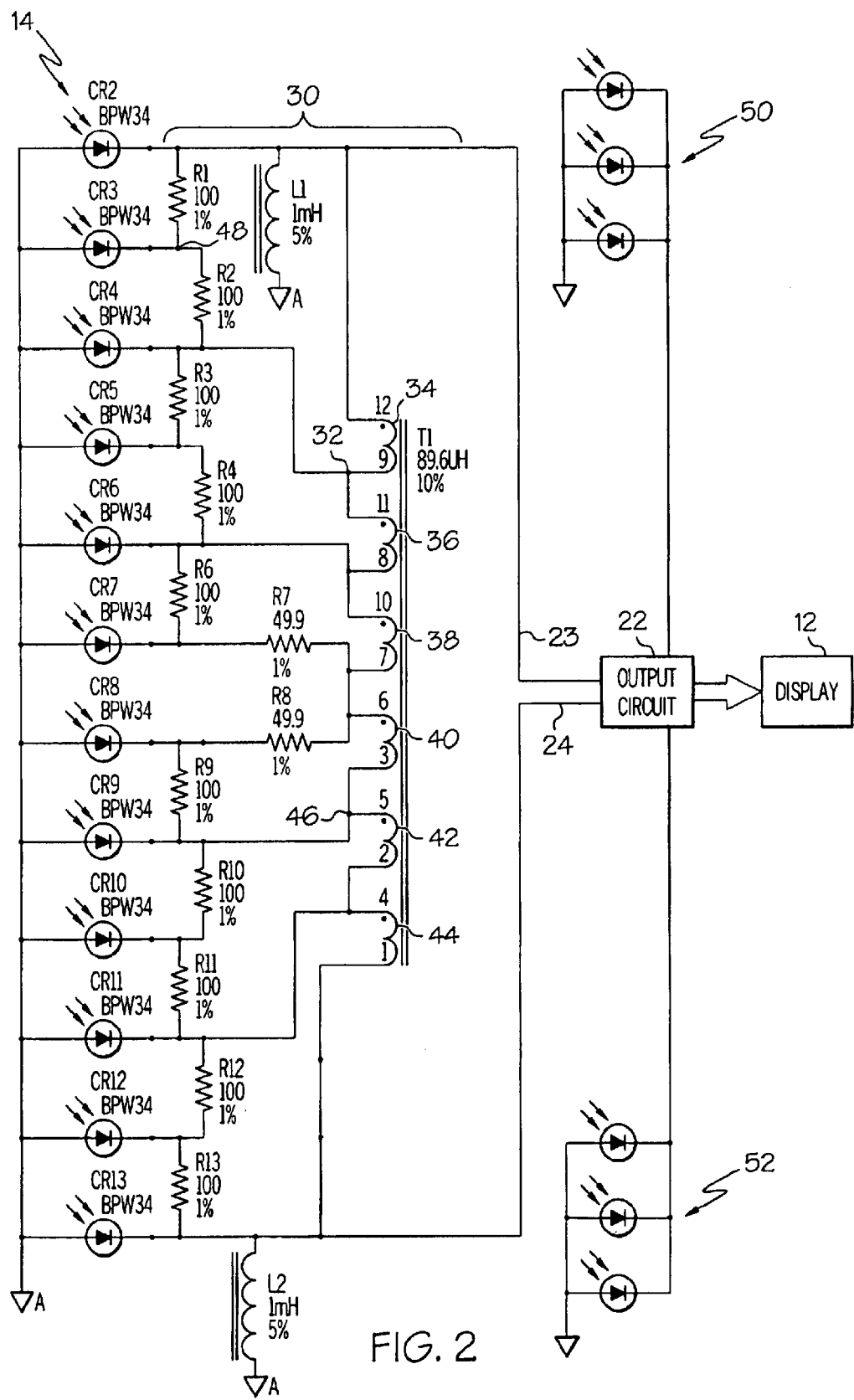
FIG. 2 is a schematic diagram of the circuitry of the device of FIG. 1.

Reference is made to FIGS. 1 and 2, which generally illustrate a detection device 10 according to the present invention. The device detects reference light, such as laser light, and provides an indication of the location of the reference light with respect to the device. It is to be understood that the device 10 may be used with transmitters that provide either a stationary plane or field of light, or a rotating beam of light that is swept through a plane. Additionally, the light may be projected in a true plane, or in a conical shape or other shape to define a reference. Reference light may, for example, be produced by laser transmitters as shown in U.S. Pat. No. 4,062,634, issued Dec. 13, 1977, to Rando et al, or in U.S. Pat. No. 4,732,471, issued Mar. 22, 1988, to Cain et al, both of which are discussed above.

The detector device 10 includes a display 12, and a photodetector arrangement 14 positioned in a window or aperture 16 defined by case 18. The detector device 10 is switched on by control knob 20 and then positioned at the approximate height of the reference light. The light strikes the photodetector arrangement 14, and an output circuit 22 provides an indication on display 12 of the position of the reference plane of light with respect to the detector device. Specifically, the display 12 shown in FIG. 1 indicates whether the light is above, below, or within a reference band that is centered between the top and bottom of the photodetector means 14. Alternatively, a display may be utilized which provides more precise information regarding the position of the reference light, such as a numerical indication of position, or multi-level display.

The output circuit 22 is responsive to the relative levels of the first and second reference signals on lines 23 and 24, respectively, provided by the photodetector arrangement 14 for determining the position of the reference light. In the illustrated embodiment, the display 12, which may for example be an LCD display, includes a pair of arrows 25 and 26, and a bar 28. Arrow 25 and arrow 26 are displayed if the beam is below or above the reference band. Bar 28 is displayed if the beam is within the band. In an alternative display configuration, the arrows 25 and 26 may be replaced by a pair of triangular elements that point toward the center bar 28. Each of the triangular elements is made up of a series of generally horizontal bars. The bars are switched ON individually to indicate the distance by which the detected light is positioned above or below the center reference with greater precision. As a further alternative, the device may be provided with no display, and with the output from the output circuit 22 being supplied directly to a machine control circuit for use in automatically controlling machine position.

As discussed above, prior art detection devices have utilized a pair of detection elements, each configured in a triangular shape, and positioned such that movement of the reference light vertically causes an increase in the output signal from one of the detection elements while at the same time causing a decrease in the output signal from the other of the detection elements. The disadvantage of such a photodetector arrangement, high cost, is avoided by using a PIN diode array according to the present invention, as illustrated in FIG. 2.

The photodetector arrangement 14 includes a plurality of photodetector elements comprising PIN diodes CR2, CR3, CR4, CR5, CR6, CR7, CR8, CR9, CR10, CR11, CR12, and CR13, positioned on the device and arranged in a generally vertically oriented row. Each of the plurality of photodetector elements CR2–CR13 provides an electrical output when illuminated with the reference plane of light.

The photodetector arrangement 14 further includes a weighting circuit 30. The weighting circuit 30 includes resistors R1–R4 and R6–R13, inductors L1 and L2 (shunting D.C. sunlight current), and tapped transformer T1. Each of the plurality of photodetector elements CR2–CR13 is connected to the transformer T1, either directly or through one or more of the resistors. The weighting circuit provides a portion of the electrical output of each photodetector element as a component of the first reference signal on line 23, related to the spacing of the photodetector element from the upper end of the row. The weighting circuit also provides a portion of the electrical output of each photodetector element as a component of the second reference signal on line 24, related to the spacing of the photodetector element from the lower end of the row. The weighting circuit 30 is configured such that the first reference signal on line 23 increases as the light moves toward the upper end of the row of PIN diodes, and the second reference signal on line 24 increases as the light moves toward the lower end of the row. Conversely, the first reference signal on line 23 decreases as the light moves toward the lower end of the row of PIN diodes CR2–CR13, and the second reference signal on line 24 decreases as the light moves toward the upper end of the row. When the light is in the middle of the row, the levels of the two reference signals on lines 23 and 24 are equal. The output circuit 22 responds to relative levels of the first and second reference signals on lines 23 and 24 to determine the position of the reference plane of light.

The weighting circuit 30 provides reference current level signals on lines 23 and 24 in the following manner. Assume that only PIN diode CR4 is illuminated. The output current from diode CR4 will be supplied to node 32 of transformer T1. Approximately 5/6 of the current will pass through coil 34 to line 23, while 1/6 of the current will pass through coils 36, 38, 40, 42, and 44 to line 24. In similar fashion, assume that the reference light has moved such that only PIN diode CR9 is illuminated. The output current from PIN diode CR9 will be supplied to node 46 of transformer T1. Approximately 4/6 of the current from diode CR9 will pass through coils 42 and 44 to line 24, while 2/6 of the current will pass through coils 34, 36, 38, and 40 to line 23. Thus the way in which the diode current is split and supplied to lines 23 and 24 gives an indication of which of the diodes is illuminated and, therefore, the position of the reference light.

It will be noted that a number of the photodetector elements are not connected directly to a tap of the transformer T1. For example, diode CR3 has its output supplied to node 48. The current at node 48 is then split, with half passing through resistor R1 to line 23, and the other half passing through resistor R2 to node 32. At node 32, 5/6 of this half of the current passes through coil 34 to line 23, and the remaining 1/6 of this half of the passes through coils 36, 38, 40, 42, and 44 to line 24. This results in approximately 11/12 of the current being supplied to line 23.

It will be appreciated that the reference light may commonly illuminate more than one of the PIN diodes CR2–CR13 at a time. This may occur because the size of the reference beam of laser light is significantly greater than the size of the photodetector elements. Further, thermal gradients in the air through which the laser light passes may result in rapid positional fluctuation of the beam, effectively illuminating a number of photodetector elements at once as the beam flutters between the elements. The weighting circuit 30 of the present invention splits the current from each of the multiple photodetector elements in dependence upon the position of the photodetector element in the row. As a consequence, the resulting signal levels on lines 23 and 24 are the sums of the various illuminated photodetector elements, and these signal levels accurately reflect the average position of the middle of the beam.

In this regard, note that a reference beam of light that is centered on the row will illuminate at least both diodes CR7 and CR8, providing equal current levels on lines 23 and 24. Any movement of the light upward from the centered position will result in an immediate increase in the current to line 23 and a decrease in the current to line 24. Similarly, any movement of the light downward from the centered position will result in an immediate increase in the current to line 24 and a decrease in the current to line 23. This sensitivity in the middle of the row of photodetector elements is possible as a result of having an even number of photodetector elements in the row. If an odd number of photodetector elements were to be provided in the row, and a very small beam of light detected, it is possible that vertical movement of the beam in this region could occur without moving the beam off of the center photodetector element and without any change in the measured position.

First additional photodetector elements 50, electrically connected in parallel, are positioned on the device above the generally vertically oriented row of photodetector elements CR2–CR13. Second additional photodetector elements 52 are also electrically connected in parallel. Elements 52 are positioned on the device below the generally vertically oriented row. An output from the first additional photodetector elements 50 indicates that the plane of light is significantly above the middle of the generally vertically oriented row of photodetector elements. An output from the second additional photodetector elements 52 indicates that the plane of light is significantly below the middle of said generally vertically oriented row of photodetector elements. Although not specifically illustrated in FIG. 1, the first additional photodetector elements 50 and the second additional photodetector elements 52 extend in generally vertical rows.

The plurality of photodetector elements CR2–CR13, positioned adjacent each other on the device, are evenly spaced along a generally vertically oriented row. It is desired that the elements CR2–CR13 be spaced apart by distances that are small as compared to the thickness of the reference plane of light that is to be detected. It will be appreciated that such spacing is desirable so that as the light moves vertically with respect to the row of elements it will move onto an element as it moves off of an adjacent element. If the spaces between adjacent elements are too large, the levels of the signals on lines 23 and 24 may fluctuate undesirably, even though their relative amplitudes continue to reflect accurately the position of the light.

The first additional photodetector elements 50 and the second additional photodetector elements 52 also may be evenly spaced vertically. However, the spacing between adjacent first additional photodetector elements 50 and the spacing between adjacent second additional photodetector elements 52 may both be greater than the spacing between adjacent ones of the plurality of photodetector elements CR2–CR13 in the generally vertically oriented row. This is so because the elements 50 and 52 are not intended to provide an accurate measure of reference light location, only a general indication that the light is too high or too low by a significant margin.

The output circuit 22 preferably includes a separate filter circuit, current-to-voltage amplifier circuit, and peak detection and hold circuit connected in series to each of lines 23 and 24 for processing the first and second reference signals on those lines. Preferably the reference signals are converted to digital form. The relative levels of the processed first and second reference signals are assessed by output circuit 22 to determine the position of the reference plane of light with respect to row of PIN diodes CR2–CR13. This can be accomplished in a variety of ways. For instance, if the relative levels of the first and second reference signals on lines 23 and 24 change linearly as the light moves up and down the row, the reference light will be spaced along the row by a fraction of the row length that is equal to the fraction of one of the reference signals divided by the sum of the first and second reference signals. By this technique, it will be appreciated that the absolute intensity of the light striking the photodetector elements is immaterial. Rather, it is the relative levels of the two reference signals from the circuit 30 that define the position of the reference light. Alternatively, the ratio of the first and second reference signals may be taken and used as the address for a table look up algorithm. It will be appreciated that the position of the reference light may be categorized in broad or narrow bands, or specified with any level of precision desired. It will be appreciated that the device of the present invention detects the relative position of a generally horizontal reference plane of light and provides two reference output signals in the manner of the special triangular-shaped photodetectors of the prior art, but at a fraction of the cost.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A device for detecting the relative position of a generally horizontal reference plane of light, comprising:

a plurality of photodetector elements positioned on said device and arranged in a generally vertically oriented row, each of said plurality of photodetector elements providing an electrical output when illuminated with said plane of light, a weighting circuit for providing a portion of the electrical output of each photodetector element as a first reference signal related to the spacing of the photodetector element from a first end of said row, and for providing a portion of the electrical output of each photodetector element as a second reference signal related to the spacing of the photodetector element from the second end of said row, an output circuit, responsive to said weighting circuit, for determining the relative levels of said first and second reference signals such that the position of said reference plane of light with respect to said detector device is determined.

2. The device for detecting the relative position of a generally horizontal reference plane of light according to claim 1, further comprising first additional photodetector elements electrically connected in parallel and positioned on said device above said generally vertically oriented row, and second additional photodetector elements electrically connected in parallel and positioned on said device below said generally vertically oriented row, such that an output from said first additional photodetector elements indicates that said plane of light is significantly above the middle of said generally vertically oriented row of photodetector elements and an output from said second additional photodetector elements indicates that said plane of light is significantly below the middle of said generally vertically oriented row of photodetector elements.

3. The device for detecting the relative position of a generally horizontal reference plane of light according to claim 2, in which first additional photodetector elements extend in a generally vertical row, and in which said second additional photodetector elements extend in a generally vertical row.

4. The device for detecting the relative position of a generally horizontal reference plane of light according to claim 1, in which said plurality of photodetector elements positioned on said device and arranged in a generally vertically oriented row includes an even total number of photodetector elements.

5. A device for detecting the relative position of a generally horizontal reference plane of light, comprising:

a plurality of photodetector elements positioned on said device and arranged in a generally vertically oriented row, each of said plurality of photodetector elements providing an electrical output when illuminated with said plane of light, said photodetector elements comprising PIN diodes, a weighting circuit for providing a portion of the electrical output of each photodetector element as a first reference signal related to the spacing of the photodetector element from a first end of said row, and for providing a portion of the electrical output of each photodetector element as a second reference signal related to the spacing of the photodetector element from the second end of said row, an output circuit, responsive to said weighting circuit, for determining the relative levels of said first and second reference signals such that the position of said reference plane of light with respect to said detector device is determined.

6. A device for detecting the relative position of a generally horizontal reference plane of light, comprising:
a plurality of photodetector elements positioned on said device and arranged in a generally vertically oriented row, each of said plurality of photodetector elements providing an electrical output when illuminated with said plane of light,
a weighting circuit for providing a portion of the electrical output of each photodetector element as a first reference signal related to the spacing of the photodetector element from a first end of said row, and for providing a portion of the electrical output of each photodetector element as a second reference signal related to the spacing of the photodetector element from the second end of said row, said weighting circuit comprising a tapped transformer with each of said plurality of photodetector elements being connected to said transformer,
an output circuit, responsive to said weighting circuit, for determining the relative levels of said first and second reference signals such that the position of said reference plane of light with respect to said detector device is determined.

7. The device for detecting the relative position of a generally horizontal reference plane of light according to claim 6, in which said weighting circuit further comprises one or more resistors connecting said photodetector elements to said transformer.

8. The device for detecting the relative position of a generally horizontal reference plane of light according to claim 1, in which said plurality of photodetector elements positioned adjacent each other on said device are evenly spaced along said generally vertically oriented row.

9. The device for detecting the relative position of a generally horizontal reference plane of light according to claim 3, in which said first additional photodetector elements and said second additional photodetector elements are evenly spaced vertically.

10. The device for detecting the relative position of a generally horizontal reference plane of light according to claim 9, in which the spacing between adjacent first additional photodetector elements and the spacing between adjacent second additional photodetector elements are both greater than the spacing between adjacent ones of said plurality of photodetector elements in said generally vertically oriented row.

11. The device for detecting the relative position of a generally horizontal reference plane of light according to claim 1, further comprising a display, responsive to said output circuit, for providing an indication of said position of said reference plane of light with respect to said detector device.

12. A method for detecting the relative position of a generally horizontal reference plane of light, comprising:
positioning a plurality of photodetector elements in a generally vertically oriented row, each of said plurality of photodetector elements providing an electrical output when illuminated with said plane of light,
providing a portion of the electrical output of each photodetector element as a first reference signal and providing a portion of the electrical output of each photodetector element as a second reference signal, the relative portions of the electrical output from each photodetector being related to the vertical position of the photodetector in the row, and
determining the position of said reference plane of light with respect to said row by determining the relative levels of said first and second reference signals.

13. The method for detecting the relative position of generally horizontal reference plane of light, according to claim 12, further comprising the step of displaying an indication of said position of said reference plane of light with respect to said row.

14. The method for detecting the relative position of a generally horizontal reference plane of light, according to claim 12 further comprising the steps of:
providing first additional photodetector elements, electrically connected in parallel and positioned above said generally vertically oriented row, and
providing second additional photodetector elements, electrically connected in parallel and positioned below said generally vertically oriented row, such that an output from said first additional photodetector elements indicates that said plane of light is significantly above the middle of said generally vertically oriented row of photodetector elements and an output from said second additional photodetector elements indicates that said plane of light is significantly below the middle of said generally vertically oriented row of photodetector elements.

15. The method for detecting the relative position of a generally horizontal reference plane of light, according to claim 14, further comprising the steps of:
positioning first additional photodetector elements extending in a generally vertical row, and
positioning second additional photodetector elements extending in a generally vertical row.

16. The method for detecting the relative position of a generally horizontal reference plane of light, according to claim 15, in which the step of positioning a plurality of photodetector elements in a generally vertically oriented row further comprises the step of providing an even total number of photodetector elements.

17. A method for detecting the relative position of a generally horizontal reference plane of light, comprising:
positioning a plurality of photodetector elements in a generally vertically oriented row, each of
said plurality of photodetector elements providing an electrical output when illuminated with said plane of light,
providing a portion of the electrical output of each photodetector element as a first reference signal and providing a portion of the electrical output of each photodetector element as a second reference signal, the relative portions of the electrical output from each photodetector being related to the vertical position of the photodetector in the row, and
determining the position of said reference plane of light with respect to said row by determining the relative levels of said first and second reference signals,
further in which the step of positioning a plurality of photodetector elements in a generally vertically oriented row further comprises the step of positioning a plurality of PIN diodes in a generally vertically oriented row.

18. A method for detecting the relative position of a generally horizontal reference plane of light, comprising:
positioning a plurality of photodetector elements in a generally vertically oriented row, each of said plurality of photodetector elements providing an electrical output when illuminated with said plane of light, providing a portion of the electrical output of each photodetector element as a first reference signal and providing a portion of the electrical output of each photodetector element as a second reference signal, the relative portions of the electrical output from each photodetector being related to the vertical position of the photodetector in the row, and determining the position of said reference plane of light with respect to said row by determining the relative levels of said first and second reference signals, in which the step of providing a portion of the electrical output of each photodetector element as a first reference signal and providing a portion of the electrical output of each photodetector element as a second reference signal includes the step of separating said portions of said electrical outputs using a tapped transformer with each of said plurality of photodetector elements being connected to said transformer.

19. The method for detecting the relative position of a generally horizontal reference plane of light, according to claim 18, in which the step of separating said portions of said electrical outputs using a tapped transformer with each of said plurality of photodetector elements being connected to said transformer further includes the step of connecting said photodetector elements to said transformer using one or more resistors.

20. The method for detecting the relative position of a generally horizontal reference plane of light, according to claim 12, in which the step of positioning a plurality of photodetector elements in a generally vertically oriented row comprises the step of evenly spacing said plurality of photodetector elements along said generally vertically oriented row.

21. The method for detecting the relative position of a generally horizontal reference plane of light, according to claim 15 in which the steps of providing first additional photodetector elements extending in a generally vertical row, and providing second additional photodetector elements extending in a generally vertical row include the step of evenly spacing said first additional photodetector elements and said second additional photodetector elements vertically.

22. The method for detecting the relative position of a generally horizontal reference plane of light, according to claim 21 in which the step of evenly spacing said first additional photodetector elements and said second additional photodetector elements vertically includes the step of spacing adjacent first additional photodetector elements and spacing adjacent second additional photodetector elements further apart than the spacing between adjacent ones of said plurality of photodetector elements in said generally vertically oriented row.

* * * * *